US010653070B2

(12) United States Patent
Kraus et al.

(10) Patent No.: US 10,653,070 B2
(45) Date of Patent: *May 19, 2020

(54) DUAL AUGER BALER

(71) Applicant: Deere & Company, Moline, IL (US)

(72) Inventors: Timothy J. Kraus, Blakesburg, IA (US); Charles Scott Sloan, Blakesburg, IA (US); Henry D. Anstey, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 179 days.

This patent is subject to a terminal disclaimer.

(21) Appl. No.: 15/799,937

(22) Filed: Oct. 31, 2017

(65) Prior Publication Data

US 2018/0249638 A1 Sep. 6, 2018

Related U.S. Application Data

(60) Provisional application No. 62/466,886, filed on Mar. 3, 2017.

(51) Int. Cl.
*A01F 15/00* (2006.01)
*A01D 39/00* (2006.01)
*A01F 15/10* (2006.01)
*A01F 15/08* (2006.01)
*A01F 15/02* (2006.01)

(52) U.S. Cl.
CPC .............. *A01F 15/10* (2013.01); *A01F 15/00* (2013.01); *A01F 15/02* (2013.01); *A01F 15/0825* (2013.01)

(58) Field of Classification Search
CPC ........ A01F 15/00; A01F 15/10; A01F 15/042; A01F 15/005; A01F 15/0841; A01F 15/071; A01F 15/0825; B30B 1/18; B30B 9/3082; B30B 9/3089; B30B 9/3025
USPC .............................. 56/341, 432; 100/88, 145
See application file for complete search history.

(56) References Cited

U.S. PATENT DOCUMENTS 2,080,316 A  5/1937  Innes
5,009,062 A  4/1991  Urich et al.
5,377,481 A  1/1995  Sibley et al.
(Continued)

FOREIGN PATENT DOCUMENTS

CN  102986382     3/2013
DE       742026 C  11/1943
(Continued)

OTHER PUBLICATIONS

European Patent Office Search Report and Search Opinion for Application No. 18158101.8 dated Jun. 29, 2018 (9 pages).

*Primary Examiner* — Robert E Pezzuto
(74) *Attorney, Agent, or Firm* — Michael Best & Friedrich LLP

(57) ABSTRACT

A baler including a frame a feed assembly coupled to the frame, an auger housing coupled to the frame and in operable communication with the feed assembly, the auger housing having an exterior wall including a first open end, a second open end opposite the first open end, and defining a volume therein. The baler also including a first auger at least partially positioned within the volume and rotatable with respect to the auger housing about a first axis, and a second auger at least partially positioned within the volume and rotatable with respect to the auger housing about a second axis.

18 Claims, 11 Drawing Sheets

(56) References Cited

U.S. PATENT DOCUMENTS

| | | | |
|---|---|---|---|
| 5,535,669 A | 7/1996 | Sibley et al. | |
| 5,553,446 A | 9/1996 | Sibley et al. | |
| 6,186,060 B1 | 2/2001 | Peterson | |
| 6,263,649 B1 * | 7/2001 | Gross | A01G 20/43 56/16.1 |
| 6,601,375 B1 | 8/2003 | Grahl et al. | |
| 6,679,042 B1 * | 1/2004 | Schrag | A01F 15/10 56/341 |
| 8,434,624 B2 * | 5/2013 | Redekop | A01D 90/02 209/137 |
| 10,058,038 B2 | 8/2018 | Posselius et al. | |

FOREIGN PATENT DOCUMENTS

| | | |
|---|---|---|
| NL | 2000013 C2 | 8/2007 |
| WO | 0124610 | 4/2001 |

* cited by examiner

DUAL AUGER BALER

CROSS-REFERENCE TO RELATED APPLICATIONS

This patent application claims priority to United States Provisional Patent Application No. 62/466,886, filed Mar. 3, 2017, which is hereby incorporated by reference.

FIELD

The present disclosure relates to an agricultural baler having a compression system utilizing multiple augers to compress the crop material.

BACKGROUND

During the haymaking process balers are used to collect and compress crop material into individual bales. More specifically, many balers produce bales having a substantially rectangular cross-sectional shape.

SUMMARY

In one implementation, a baler including a frame a feed assembly coupled to the frame, an auger housing coupled to the frame and in operable communication with the feed assembly, the auger housing having an exterior wall including a first open end, a second open end opposite the first open end, and defining a volume therein. The baler also including a first auger at least partially positioned within the volume and rotatable with respect to the auger housing about a first axis, and a second auger at least partially positioned within the volume and rotatable with respect to the auger housing about a second axis.

In another implementation, a baler including a frame, a feed assembly coupled to the frame, an auger housing coupled to the frame and configured to receive crop material from the feed assembly, the auger housing having an exterior wall including a first open end, a second open end opposite the first open end, and where the exterior wall defines a volume therein. The baler also including a first auger at least partially positioned within the volume and rotatable with respect to the auger housing about a first axis, where the first auger includes a flight defining a first flight diameter, and a second auger at least partially positioned within the volume and rotatable with respect to the auger housing about a second axis, where the second auger includes a flight defining a second flight diameter, where the first axis is parallel to the second axis, and where the first axis is spaced a first distance from the second axis that is greater than the larger of the first flight diameter and the second flight diameter.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

Figure 3:
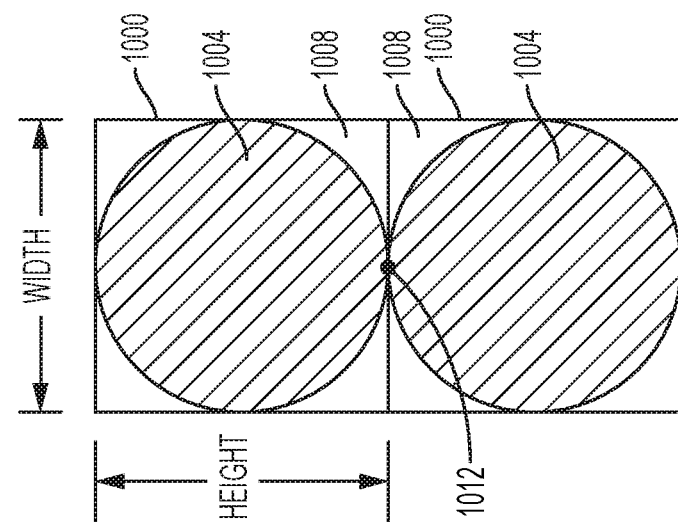
FIG. 3 is a side view of a density profile of two stacked bales formed from a single auger baler.

Single auger balers produce bales having a substantially square cross-sectional shape which can prove unstable in stacking situations (see FIG. 3). More specifically, the single auger layout produces a bale 1000 with a density profile that includes a generally circular high-density region 1004 in the middle of the bale 1000 and lower density regions 1008 positioned near each corner. As such, when attempting to stack such bales 1000, the narrow cross-sectional shape (e.g., the height is the same as the width) and single high density point of contact 1012 between the bales 1000 (described below) results in a highly unstable configuration that has a tendency to tip when multiple versions of the same bale type are stacked vertically atop one another.

The disclosure relates to a baler, and more particularly to a baler using a plurality of augers positioned within a common auger housing to compress crop material and create bales. More specifically, the baler includes a pair of augers, positioned adjacent one another to produce a square bale with improved stacking characteristics. In particular, the auger layout produces bales having a width dimension and a length dimension that is that is greater than the height dimension. Furthermore, the dual augers produce a density profile that results in multiple high density points of contact when multiple bales of the same type are stacked vertically atop one another. Together, these attributes result in bales having greatly improved stacking characteristics over bales formed from a single auger baler (described above). Furthermore, the baler includes a plurality of strippers positioned to re-direct the concentration of crop material conveyed by the augers to produce a more desirable density profile within the bale itself. More specifically, the strippers are positioned such that the stripper's leading edge is positioned in front of the front surface of the corresponding augers.

Figure 1A:
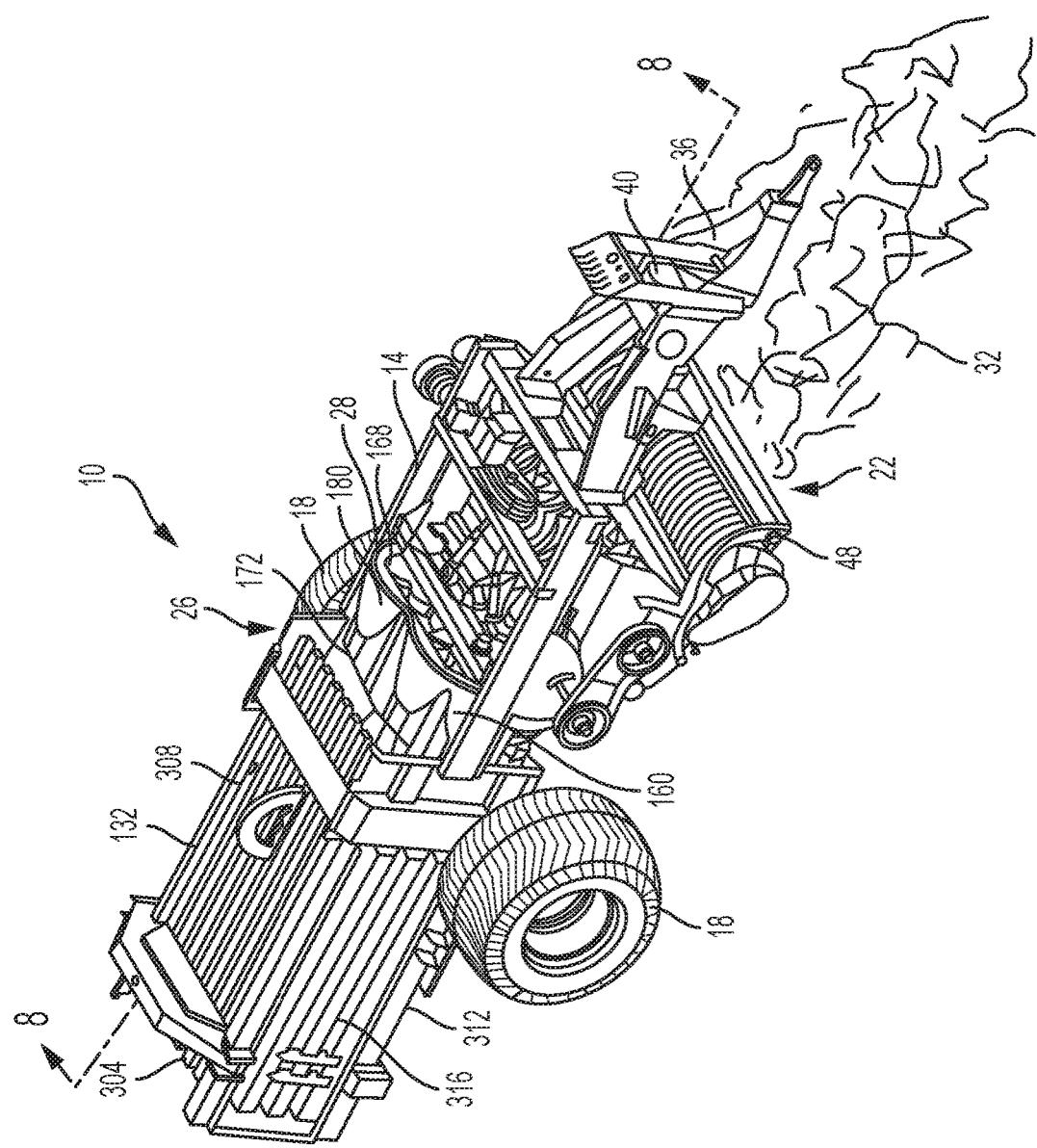
FIG. 1A is a perspective view of a baler, having a dual auger compression assembly.
Figure 1B:
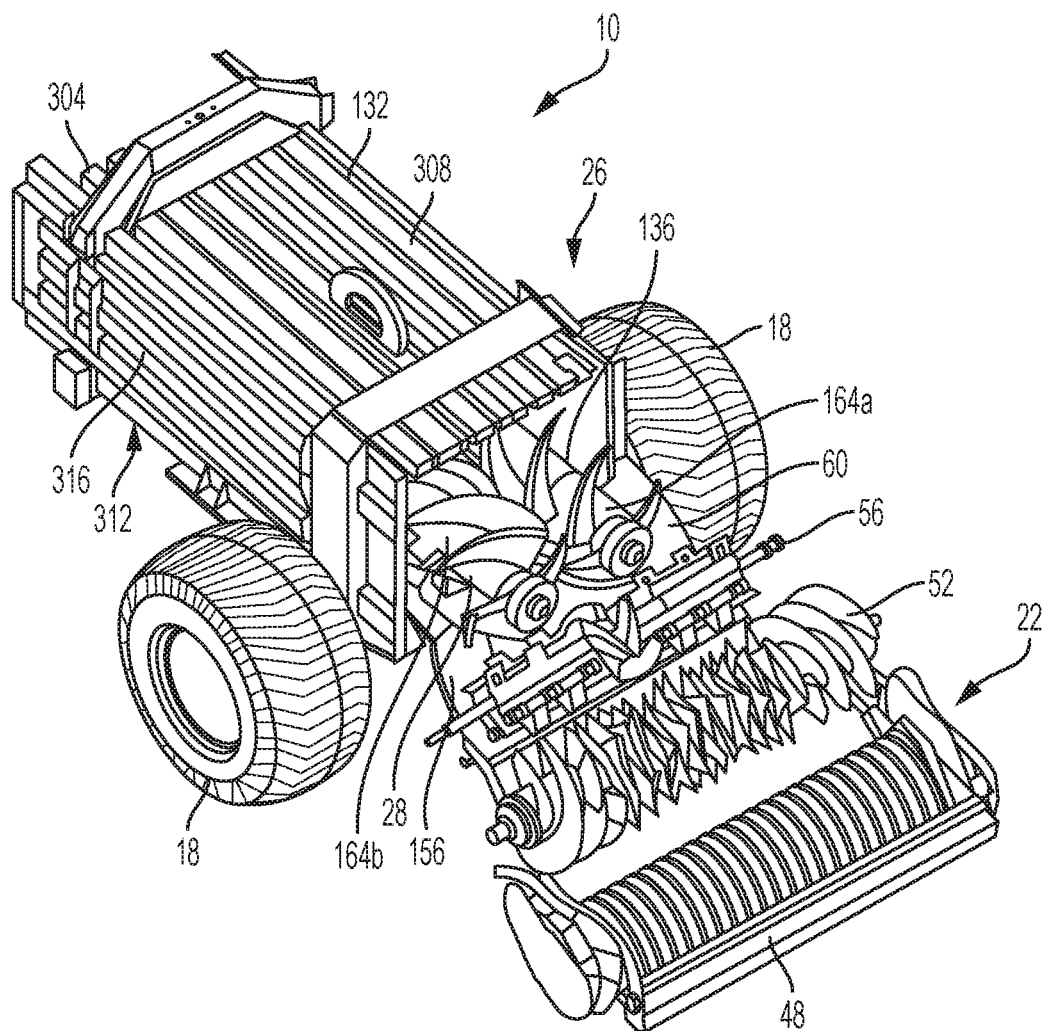
FIG. 1B is a perspective view of the baler of FIG. 1 with a portion of the housing removed.
Figure 2:
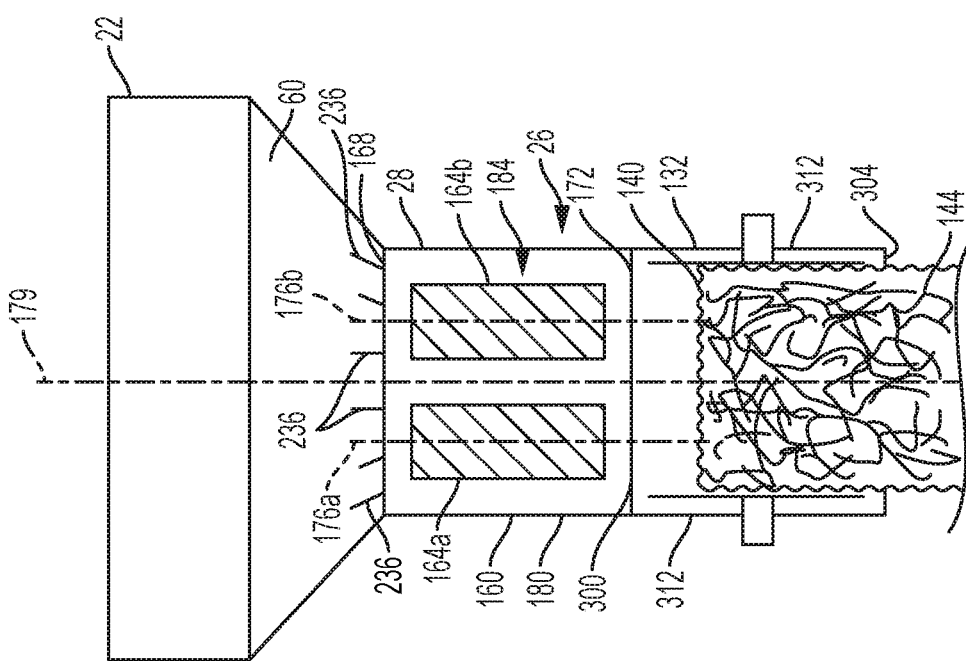
FIG. 2 is a top schematic view of the baler of FIG. 1.
Figure 4:
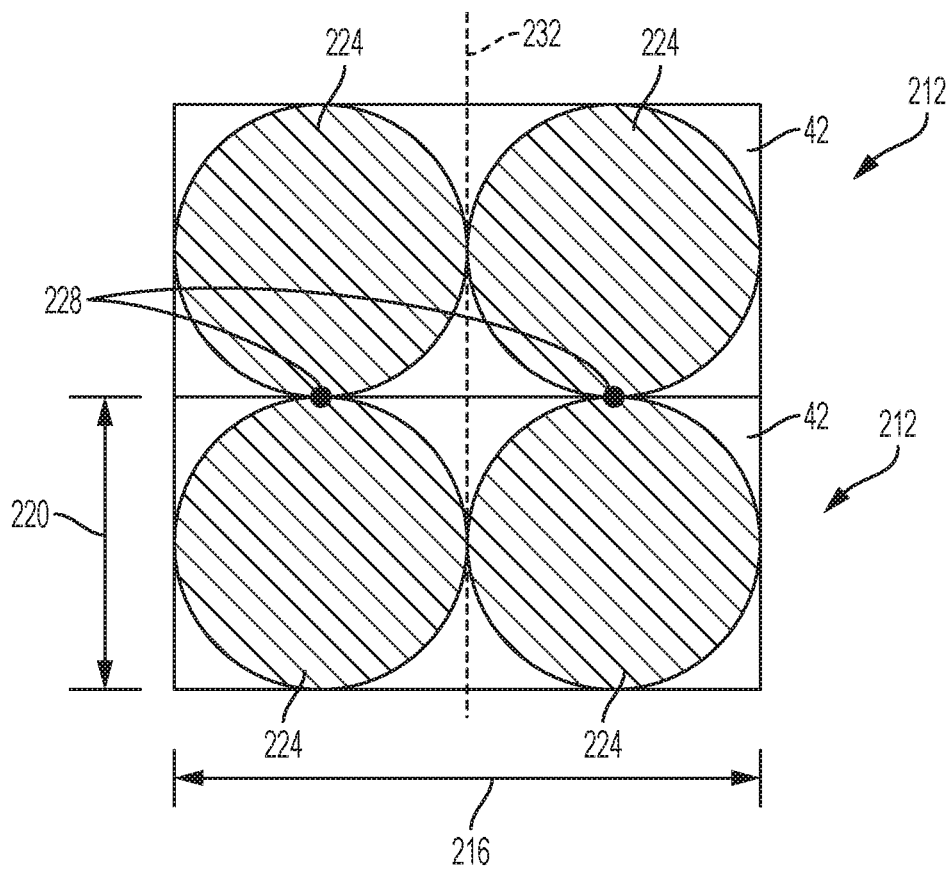
FIG. 4 is a side view of a density profile of two stacked bales formed from the baler of FIG. 1.

Referring to FIGS. 1A-2, a baler 10 includes a frame 14, a set of wheels 18 mounted on the frame 14, a feed system 22 coupled to the frame 14, and a compression system 26 having an auger assembly 28 (FIG. 1B) to receive and compress crop material 32 provided by the feed system 22. In the illustrated implementation, the baler 10 is a square baler for forming bales 42 (FIGS. 4 and 5) of a crop, such as hay, straw, or other biomasses.

In the illustrated embodiment, the frame 14 of the baler 10 includes a tow bar 36 extending from the frame 14 and connectable to a towing vehicle (not shown), such as an agricultural tractor or other vehicle. The baler 10 also includes a power takeoff shaft 40 connectable to the towing vehicle to transmit a rotating drive force from the towing vehicle to various components of the baler 10. In other implementations, the baler 10 may have a dedicated power supply and/or prime mover (not shown), such as an engine, motor, battery, fuel cell, etc., for driving the wheels 18 and for driving and/or powering the various components of the baler 10.

As shown in FIGS. 1A-2, the feed system 22 of the baler 10 is configured to pick up crop material 32 from a support surface 44 and convey it to the compression system 26. In the illustrated implementation, the feed system 22 includes a pickup assembly 48 for collecting the crop material 32 from the support surface 44, a pre-cutter 52 for shortening the length of the individual material strands of the crop material 32, and an accelerator roll 56 to direct the crop material 32 into the inlet 60 of the compression system 26 (described below). In the illustrated implementation, the pickup assembly 48 includes a roller baffle 64 oriented generally perpendicular to the direction of travel for picking up the crop material 32 and placing it in the baler 10. While the illustrated implementation includes a pre-cutter 52, it is to be understood that alternative implementations of the feed system 22 may not include a pre-cutter. Still further, other implementations may include a selectively engageable pre-cutter (not shown).

Best illustrated in FIGS. 6 and 7, the accelerator roll 56 of the feed system 22 receives crop material 32 from the pre-cutter 52 and directs the crop material 32 into the inlet 60 of the compression system 26 (described below). More specifically, the accelerator roll 56 includes a substantially cylindrical core 68 defining an axis of rotation 72 therethrough, and a plurality of vanes 76 extending radially from the cylindrical core 68 and configured to engage the crop material 32. During use, the accelerator roll 56 rotates about the axis of rotation 72 causing the vanes 76 to contact the crop material 32 and accelerate the crop material 32 generally toward the inlet 60 of the compression system 26. The size, shape, and orientation of the vanes 76 generally dictate the direction and speed at which the crop material 32 is directed toward the compression assembly 26. In the illustrated implementation, the accelerator roll 56 includes a first portion 80 proximate a first end 84 of the core 68, a second portion 88 proximate the second end 92 of the core 68, and a third portion 96 extending between the first portion 80 and the second portion 88.

The first portion 80 of the accelerator roll 56 includes a plurality of ridges 100 protruding radially outwardly from the core 68 and extending axially along the width of the portion 80. Each ridge 100, in turn, defines a plurality of mounting points 104 to which a tooth 108 may be coupled with a fastener 112 (e.g., a bolt). Together, the ridges 100 and teeth 108 at least partially define the vanes 76 of the first portion 80. In the illustrated construction, each ridge 100 includes a different number of mounting points 104 (e.g., number of teeth 108), generally alternating between an odd and even number of teeth 108 so that the teeth 108 of each ridge 100 are positioned axially between the teeth 108 of the adjacent ridges 100. In alternative implementations, different numbers, orientations, and layouts of teeth 108 may be used to better direct the crop material 32 toward the compression system 26 of the baler 10.

The second portion 88 of the accelerator roll 56 is substantially similar to the first portion 80. The second portion 88 includes a plurality of ridges 100, each with a plurality of teeth 108 coupled thereto to form vanes 76. While the vanes 76 of the second portion 88 are similar to the vane 76 of the first portion 80, in alternative implementations the second portion 88 may include a different layout than the first portion 80 to produce the desired distribution of crop material 32 during the baling operation.

The third portion 96 of the accelerator roll 56 includes a plurality of "V" shaped vanes 116 spaced equally along the periphery of the core 68 and having a leading edge 120. In the illustrated implementation, the axial width of the third portion 96 of the accelerator roll 56 is smaller than the distance between the rotation axes 176a, 176b of the augers 164a, 164b. In alternative implementations, the layout and size of the third portion 96 may be changed to produce the desired crop material distribution during the baling process.

While the illustrated accelerator roll 56 includes three portions 80, 88, 96, in alternative implementations, more or fewer portions may be included to better direct the flow of crop material 32 toward the compression system 26 during the baling process.

Illustrated in FIG. 2, the compression system 26 of the baler 10 includes an inlet 60 in communication with the feed system 22, an auger assembly 28 in communication with the inlet 60, and a bale case 132 in communication with the auger assembly 28. During operation, a generally continuous flow of crop material 32 is directed through the inlet 60 and toward the auger assembly 28 by the feed system 22. The flow of crop material 32 is then re-directed and subdivided by a plurality of strippers 236 originating upstream of the auger assembly 28 (described below). Once subdivided, the crop material 32 is then enters the auger assembly 28 and is conveyed, under pressure into the bale case 32 where the crop material 32 is then compressed against the bale face 140 of a forming bale 144. As the baling process proceeds, the auger assembly 28 continuously conveys crop material 32 against the face 140 of the forming bale 144 causing the forming bale 144 to grow into a densely packed cuboid shape having the same cross-sectional shape as the bale case 132. Over time, the build-up of the highly compressed crop material 32 against the bale face 140 of the forming bale 144 causes the forming bale 144 to extrude from the second open end 304 of the bale case 132.

Figure 11:
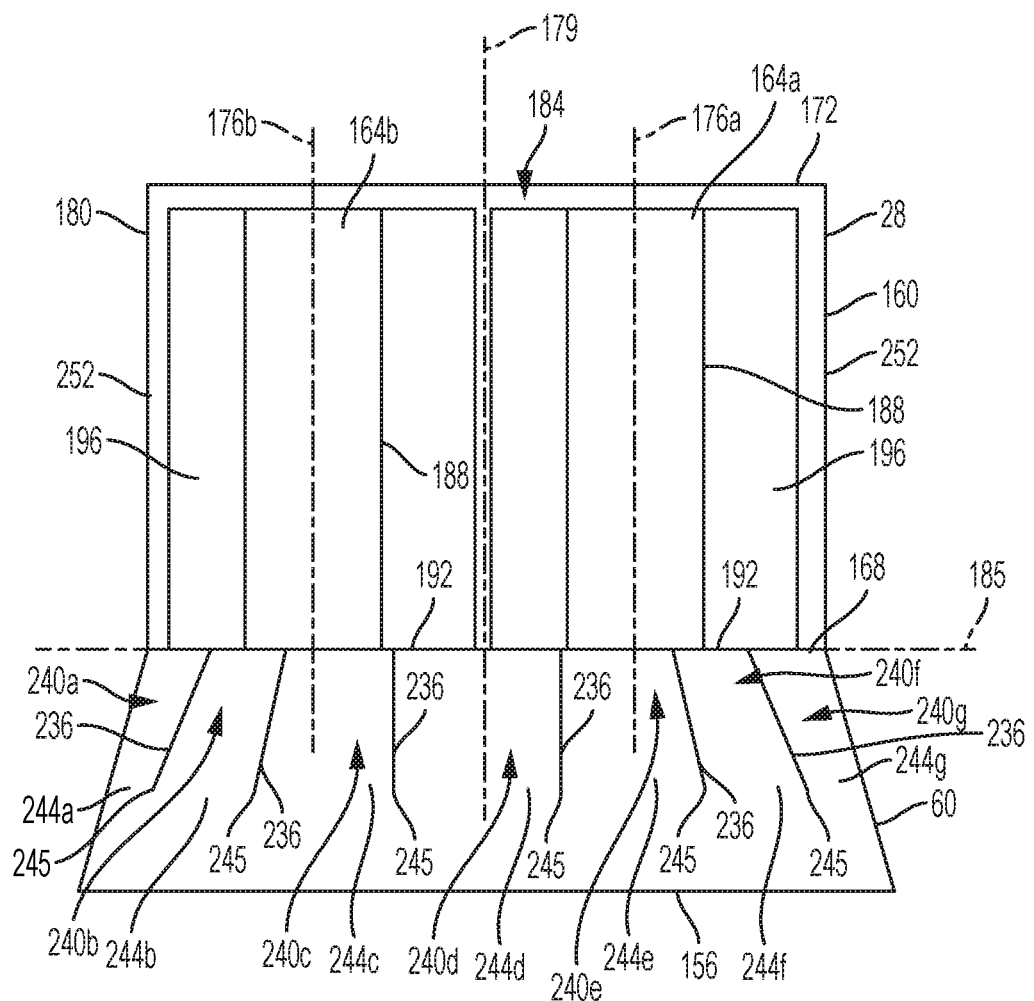
FIG. 11 is a top schematic view of the auger assembly and inlet of the baler of FIG. 1A.

Illustrated in FIG. 11, the inlet 60 of the compression system 26 includes a base wall 156 extending the width of the baler 10. The base wall 156 transitions between the elongated cross-sectional shape of the feed system 22 and the generally narrower cross-sectional shape of the auger assembly 28 and is configured to act as a chute conveying the crop material 32 between the feed system 22 and the auger assembly 28. The base wall 156 of the inlet 60 includes smooth transitions between the feed system 22 and the auger housing 160 to assure the crop material 32 can continuously flow between the feed system 22 and the auger assembly 28 without providing any impediments that would restrict the flow of crop material 32 during operation.

Illustrated in FIGS. 1A-2, 10, and 11, the auger assembly 28 of the compression system 26 includes an auger housing 160, a first auger 164a positioned within and rotatable with respect to the auger housing 160 about a first axis 176a, and a second auger 164b positioned within and rotatable with respect to the auger housing 160 about a second axis 176b. The auger assembly 28 also includes a drive train (not shown) in operable communication with both the first auger 164*a* and the second auger 164*b*.

The drive train of the auger assembly 28 receives input from the power takeoff shaft 40, which in turn is driven by an exterior source, such as a tractor and the like (described above). In alternative implementations, the drive train may be driven by a stand-alone power system, such as an internal combustion engine. The drive train typically includes a gearset or chain in operable communication with both the first auger 164*a* and the second auger 164*b*. In some implementations, the drive train of the auger assembly 28 synchronizes the rotation of both augers 164*a*, 164*b* such that both augers rotate at substantially the same speed (e.g., within approximately 10% the speed of one another). In such implementations, the drive train rotates the augers 164*a*, 164*b* in opposite directions (e.g., one auger rotates clockwise and the other auger rotates counter-clockwise); although in some implementations both augers 164*a*, 164*b* may rotate in the same direction. In other implementations, the drive train may be configured to drive each auger 164*a*, 164*b* independently. In such implementations, the drive train may speed up or slow down the relative speed of each auger in order to at least partially control the rate at which crop material 32 is conveyed by that particular auger. For example, if additional crop material 32 is desired on a first side of the crop face 140 (e.g., to even out the forming bale density), the drive train may increase the rate of rotation of the auger proximate the first side relative to the speed of the auger positioned proximate a second side so that additional crop material 32 is provided to the first side. In contrast, if too much crop material 32 is being provided to the first side, the drive train may decrease the rate of rotation of the auger proximate the first side relative to the speed of the auger positioned proximate the second side to provide less crop material to the first side.

Figure 10:
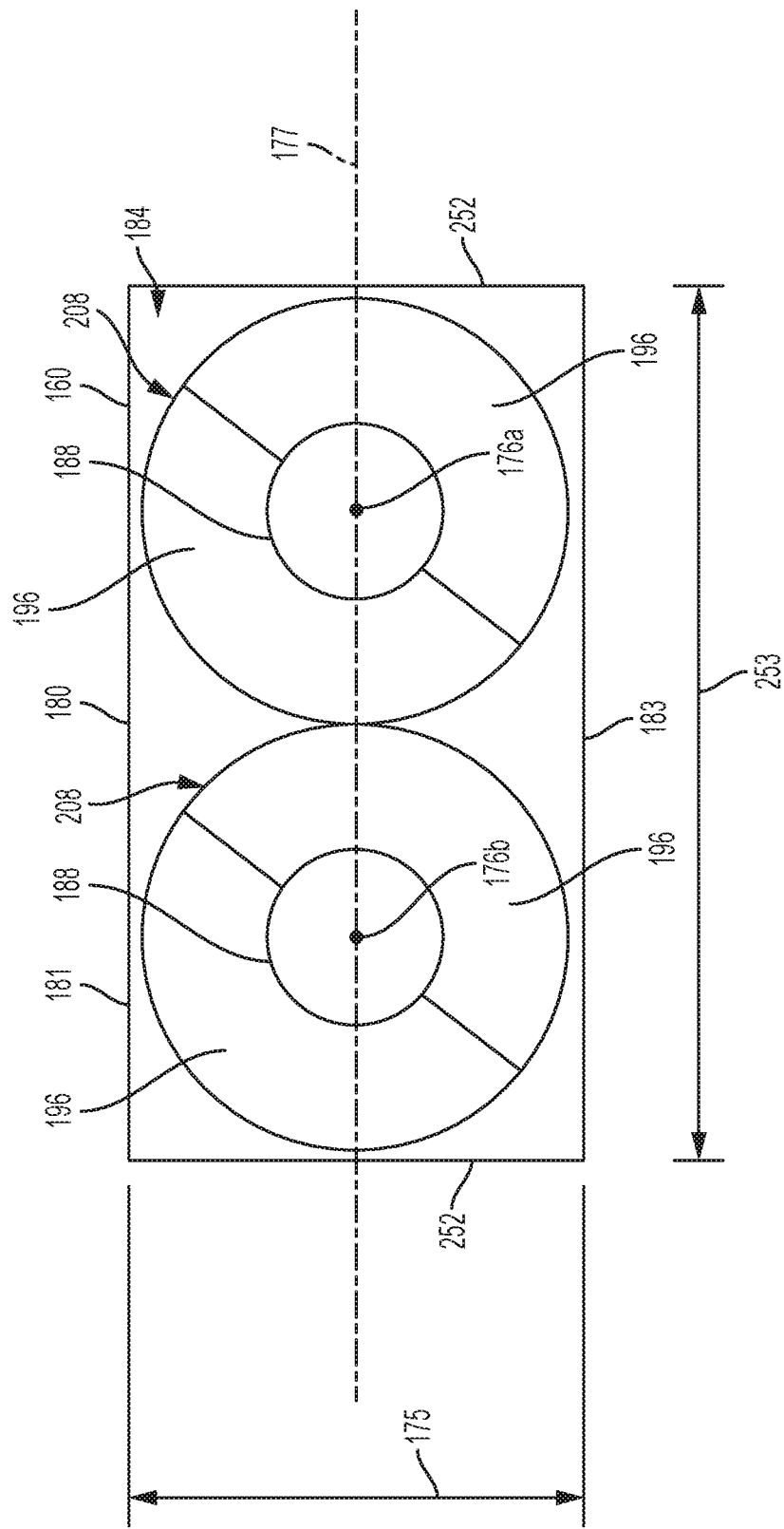
FIG. 10 is a schematic front view of the auger assembly of the baler of FIG. 1A.

Illustrated in FIGS. 10 and 11, the auger housing 160 of the auger assembly 28 is substantially elongated in shape having a first open end 168 configured to receive crop material 32 from the inlet 60, and a second open end 172 opposite the first open end 168. The auger housing 160 also defines an auger housing axis 179 extending along the length of the auger housing 160 proximate its center. In the illustrated implementation, the auger housing 160 includes an exterior housing wall 180 defining a volume 184 therethrough. The exterior housing wall 180, in turn, includes a first or top wall 181, a second or bottom wall 183 opposite the first wall 181, and a pair of opposing sidewalls 252 extending between the first and second walls 181, 183. In the illustrated implementation, the sidewalls 252 are spaced a first distance 253 from one another generally corresponding to the width of the baler 10 (see FIG. 10).

The exterior wall 180 of the auger housing 160 generally transitions in shape between the first open end 168, where the cross-sectional shape of the volume 184 taken perpendicular to the axis 179 is two partially-overlapping circles (e.g., generally conforms to the outer contour of the two augers 164*a*, 164*b* positioned side-by-side), and the second open end 172, where the cross-sectional shape of the volume 184 taken perpendicular to the axis 179 is substantially rectangular. More specifically, the cross-sectional shape of the volume 184 at the second open end 172 substantially dictates the cross-sectional shape of the forming bale 144. In the illustrated implementation, the cross-sectional shape of the volume 184 at the second open end 172 includes a first dimension 253, extending between the two sidewalls 252, that is larger than its second dimension 175, extending between the first and second walls 181, 183 (see FIG. 10). More specifically, the first dimension 173 is approximately twice as large as the second dimension 175.

Figure 6:
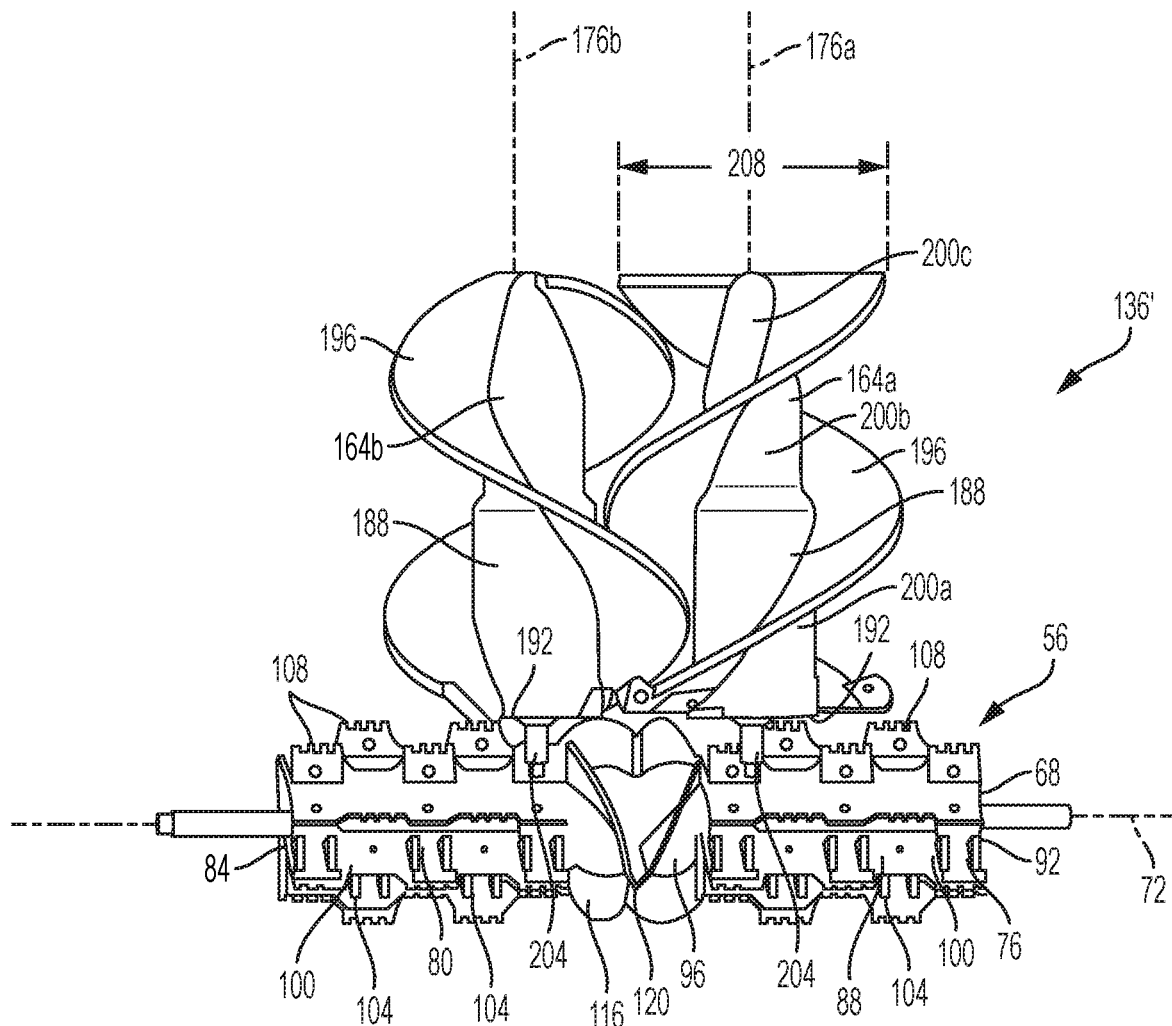
FIG. 6 is a top view of the accelerator roll and auger assembly of an alternative implementation of the baler.
Figure 7:
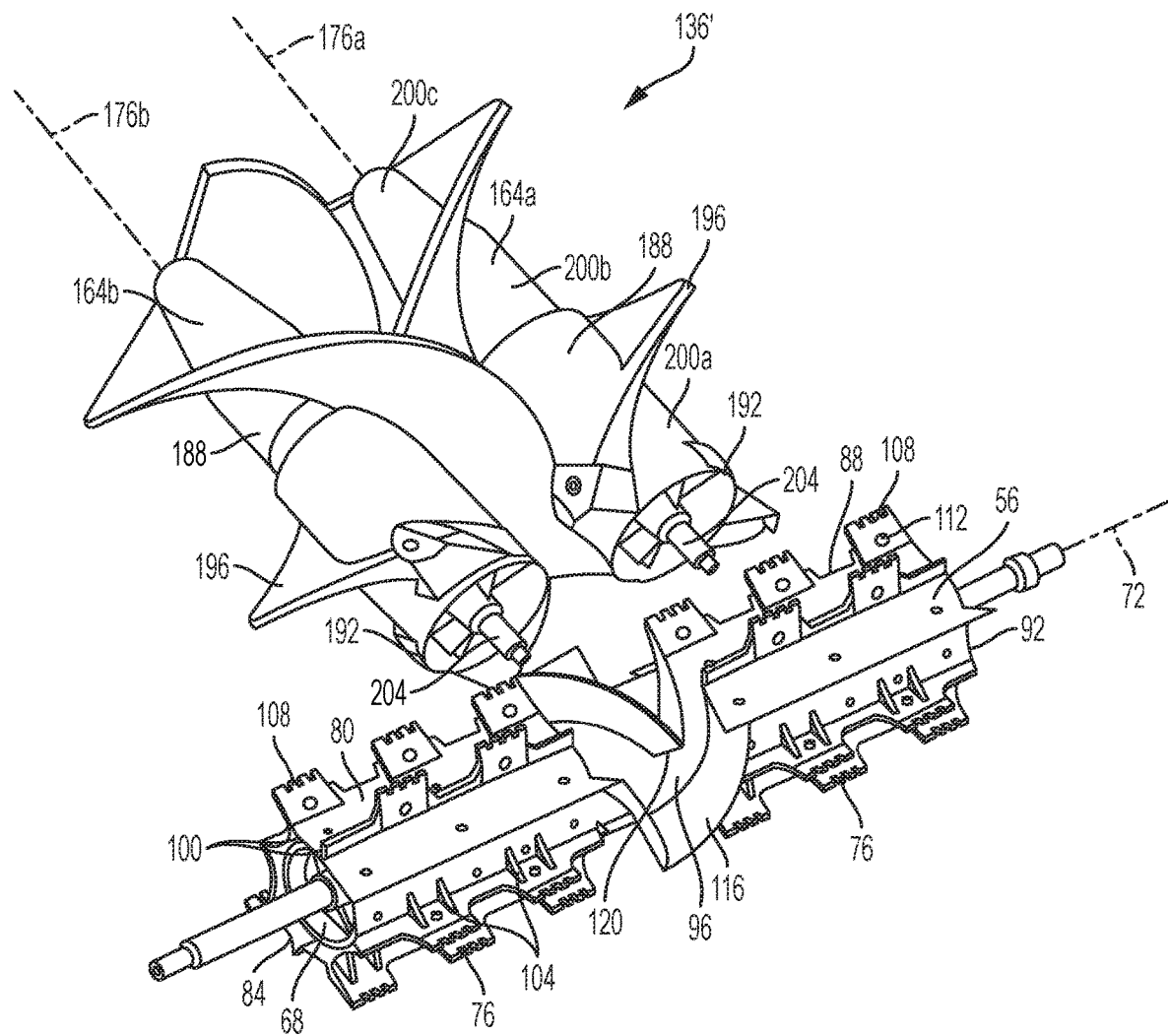
FIG. 7 is a perspective view of the accelerator roll and auger assembly of FIG. 6.

Illustrated in FIGS. 6 and 7, the first auger 164*a* of the auger assembly 28 is substantially cylindrical in shape and includes a core 188 that includes a front end 192 and defines the axis of rotation 176*a* therethrough (see FIGS. 6 and 7). The first auger 164*a* also includes one or more flights 196. The core 188 of the first auger 164*a* includes a plurality of stepped portions 200*a*, 200*b*, 200*c* each having an increasingly smaller outer diameter as the core 188 extends axially from the front end 192. More specifically, the core 188 includes three sections with increasingly smaller outer diameters. The core 188 also includes a pair of co-axial supports 204 by which the first auger 164*a* is supported within the volume 184 of the auger housing 160.

Each flight 196 of the first auger 164*a* originates proximate the front end 192 of the core 188 and extends axially rearwardly in a helical pattern. More specifically, the first auger 164*a* includes two flights 196 positioned 180 degrees apart from one another each forming a clockwise helical pattern. Each flight 196 also makes approximately one complete rotation about the core 188 over the axial length of the auger 164*a*.

While the illustrated implementation of the first auger 164*a* includes two flights 196, it is to be understood that in alternative implementations, more or fewer flights may be included. Furthermore, while the illustrated implementation includes flights 196 making a single rotation about the core 188 over the axial length of the core 188, in alternative implementations, the flights 196 may make between approximately one-half of a rotation about the core 188 to approximately two rotations about the core 188. In still other implementations, the flights 196 may make less than one rotation about the core 188. While each flight is shown extending the entire axial length of the core 188 and forming the same number of rotations, it is to be understood that in alternative implementations, each flight may extend a unique length or form a unique number of rotations about the core from other flights.

Figure 12A:
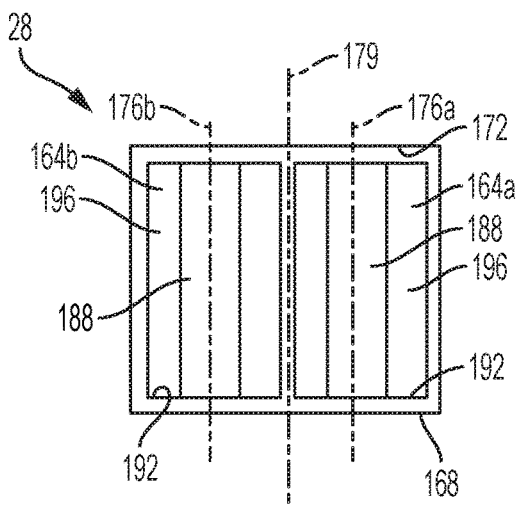
FIGS. 12A-D are top schematic views illustrating various auger layouts.
Figure 12B:
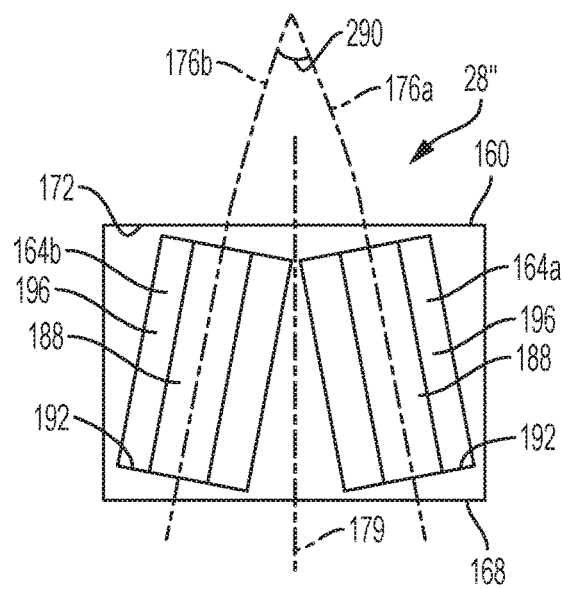
Figure 12C:
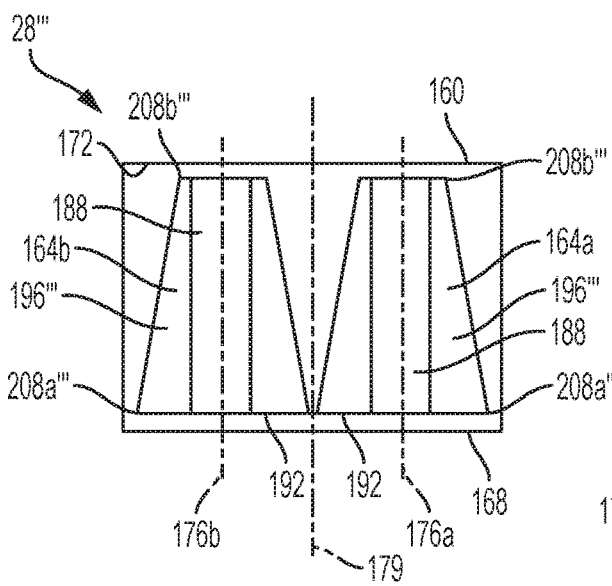
Figure 12D:
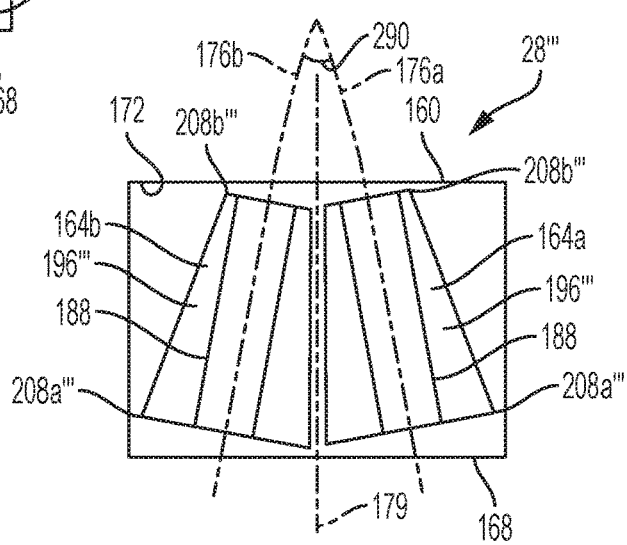

Still further, while the flights 196 of the illustrated first auger 164*a* have a constant flight diameter 208 along the entire axial length of the auger 164*a*, it is to be understood that in alternative implementations, the flight diameter 208 of the auger 164*a* may vary along its axial length (see FIGS. 12C and 12D).

In still further implementations, each flight 196 may include a unique contour where the flight varies from a straight radial orientation. For example, in some implementations, the end of the flight 196 may cup forward or rearward (not shown). In still other implementations, each flight 196 may include a rib (not shown) extending along the length thereof.

Illustrated in FIGS. 6 and 7, the second auger 164*b* of the auger assembly 28 is substantially similar to the first auger 164*a* having a core 188 and one or more flights 196. As such, only the differences between the first auger 164*a* and the second auger 164*b* will be described in detail herein. Each flight 196 of the second auger 164*b* generally extends in a counter-clockwise helical pattern opposite that of the clockwise helical pattern of the first auger 164*a*.

As shown in FIGS. 1A, 1B, 2, 10, 11, and 12A, the first auger 164*a* and the second auger 164*b* are at least partially positioned within the volume 184 of the auger housing 160 and rotatable with respect thereto about the first axis 176*a* and the second axis 176*b*, respectively. The first and second augers 146*a*, 146*b* form an auger inlet plane 185 oriented perpendicular the axis auger housing axis 179 and aligned with the front end 192 of both augers. More specifically, the first and second augers 164a, 164b are oriented within the volume 184 such that the first axis 176a and the second axis 176b lie on a first plane 177 (see FIG. 10) and are parallel. The first plane 177 is at least partially defined by the auger housing axis 179 and is oriented substantially coplanar to the second wall 183 (e.g., substantially horizontal).

The augers 164a, 164b are also positioned so that the first auger 164a is adjacent to the second auger 164b and the first axis 176a is positioned a first distance from the second axis 176b that is slightly larger than the largest flight diameter 208 of the two augers 164a, 164b. As such, the flights 196 of the first auger 164a do not overlap the flights 196 of the second auger 164b in the direction of the first distance (e.g., in a radial direction). As a result, the two augers 164a, 164b define a cross-sectional area that is generally wider than it is tall, and more specifically define a cross-sectional shape that is substantially two flight diameters wide by one flight diameter tall. This shape, in turn, at least partially dictates the height and width of the second open end 172 of the auger housing 160 and, as a corollary, defines the height and width of the cross-sectional shape of the forming bale 144.

During operation, both augers 164a, 164b rotate with respect to the auger housing 160 about their respective axis of rotation 176a, 176b. As the augers 164a, 164b rotate, the flights 196 of each auger 164a, 164b convey the crop material 32 along the axial length of the augers 164a, 164b and out the second open end 172. The interaction between the first auger 164a and the second auger 164b create a first density profile 212 at the bale face 140 of the forming bale 144. As described above, the density profile 212 of the forming bale 144 ultimately becomes the density profile of the bale 42. In the first density profile 212, the two augers 164a, 164b produce a bale 42 having a substantially rectangular cross-sectional shape where the width 216 (generally corresponding with the first dimension 253 of the auger housing 160) is greater than the height 220 (generally corresponding with the second dimension 175 of the auger housing 160). More specifically, the cross-sectional shape of the bale 42 has a width 216 that is approximately twice its height 220 (see FIG. 4). Furthermore, the first density profile 212 includes two generally circular high density regions 224 positioned tangent one another (see FIG. 4). When two bales 164a, 164b with the first density profile 212 are stacked atop one another, the first density profile 212 produces multiple high density points of contact 228. More specifically, the first density profile 212 produces two high density points of contact 228 spaced either side of the midline 232 of the width 216 of the bale 42. For the purposes of this application, a high density point of contact 228 includes a location where a high density region 224 of one bale is aligned and comes into contact with the high density region 224 of another bale stacked thereon.

While the illustrated implementation includes two identical augers 164a, 164b, it is to be understood that in alternative implementations, more or fewer augers 164 may be present as necessary to produce the desired cross-sectional shape of the bale 42 and the desired density profile. Furthermore, while the augers 164 of the present implementation are similar in size, in alternative implementations, each auger 164 may be a different size or rotate at a different speed.

Figure 8:
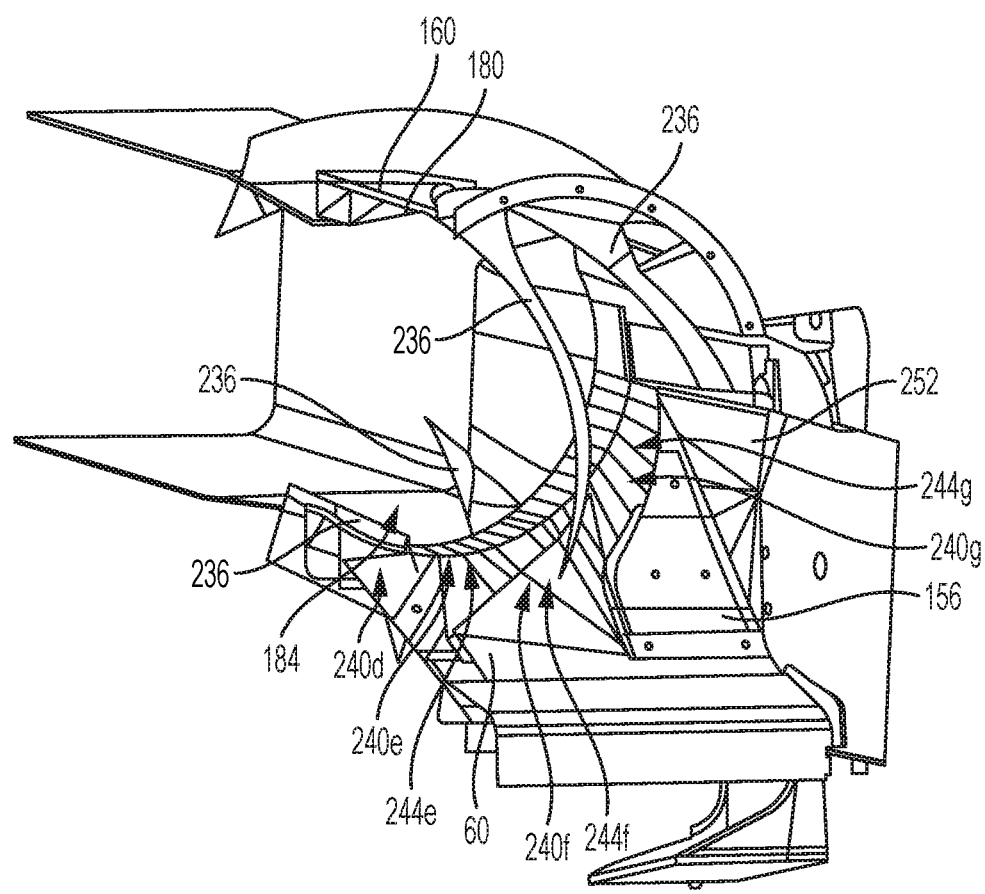
FIG. 8 is a section view of the auger housing taken along line 8-8 of FIG. 1A.
Figure 9:
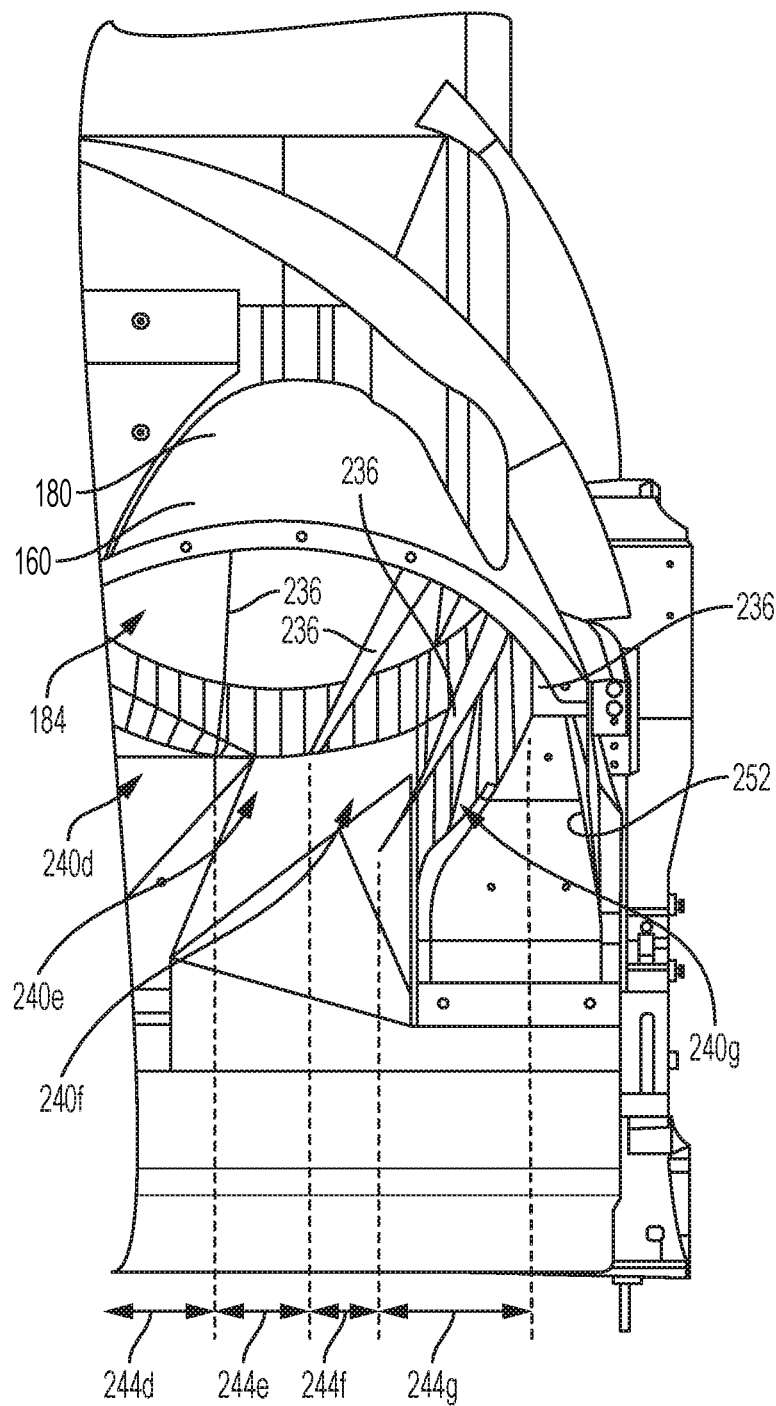
FIG. 9 is a top view of the auger housing of FIG. 8.

Illustrated in FIGS. 8, 9, and 11, the compression system 28 also includes a plurality of strippers 236 configured to subdivide and re-distribute the crop material 32 before it enters the volume 184 of the auger housing 160 and is engaged by the augers 164a, 164b. Each stripper 236 includes a leading edge 245, positioned upstream of the auger inlet plane 185 relative to the flow of crop material 32 through the baler 10 (e.g., positioned within the inlet 60 of the compression assembly 28; see FIG. 11), and a trailing edge (not shown), positioned downstream of the leading edge 245. During operation, the strippers 236 are configured to at least partially subdivide the flow of the crop material 32 into one or more sub-flows before the crop material 32 is engaged by the augers 164a, 164b. The strippers 236 then extend beyond the auger inlet plane 185 where they continue to direct the flow of crop material 32 as it is conveyed by the augers 164a, 164b to the second open end 172. As such, the strippers 236 help produce a more desirable density profile within the forming bale 144.

The strippers 236 are positioned such that they divide the area between the auger inlet plane 185 and the feed system 22 into a plurality of sub-sections 240a-g through which the crop material 32 can pass during operation. More specifically, each sub-section 240 is at least partially defined by two adjacent strippers 236. Furthermore, each sub-section 240a-g includes an inlet 244a-g defined by the leading edges 245 of the two adjacent strippers 236, and an outlet (not shown) defined by the trailing edges of the two adjacent strippers 236. For the purposes of this application, the "width" of an inlet 244a-g of a sub-section 240a-g is defined as the shortest linear distance between the leading edges 245 of the two adjacent strippers 236 at least partially defining the corresponding sub-section.

During operation, the relative location, orientation, and size of each sub-section 240a-g at least partially dictates the amount and concentration of crop material 32 that will pass through each sub-section 240a-g. For example, a sub-section 240a-g with an inlet 244a-g that is larger than its outlet (not shown) will generally cause the crop material 32 to become more concentrated as it passes through the corresponding sub-section 240a-g. In contrast, a sub-section 240a-g with an inlet 244a-g that is smaller than the outlet will generally cause the crop material 32 to become less dense as it passes through the corresponding sub-section 240a-g. Still further, the relative width each inlet 244a-g at least partially determines the proportion of crop material 32 that passes through each individual sub-section 240a-g. Generally speaking, the larger the width of an inlet 244a-g, the greater the proportion of crop material 32 that will pass through the respective sub-section 240a-g.

Still further, the location of the inlet 244a-g of a particular sub-section 240a-g within the auger housing 160 at least partially determines the proportion of crop material 32 that passes through that particular sub-section 240a-g. Generally speaking, a higher concentration of crop material 32 is positioned proximate the sides of the auger housing 160 (e.g., proximate the sidewalls 252) than proximate the center of the auger housing 160 (e.g., proximate the axis 179 of the auger housing 160; see FIG. 11). As such, a greater amount of crop material 32 would flow through a sub-section 240a-g positioned proximate the sidewalls 252 of the auger housing 160 (e.g., sub-sections 240a, 240g) than a similarly sized sub-section 240 positioned proximate the center (e.g., sub-section 240d).

Still further, the shape, size, and contour of the strippers 236 can be used to direct the flow of crop material 32 to specific areas of the auger assembly 28 to help the augers 164a, 164b more evenly output the crop material 32 against the bale face 140 of the forming bale 144. For example, after passing beyond the auger inlet plane 185 some strippers 236 may extend along a substantially helical path co-axial the axis 176a, 176b of the corresponding auger 164a, 164b.

Other strippers 236 may extend axially along a portion of the length of the auger housing 160.

In the illustrated implementation, the strippers 236 are spaced such that the inlets 244a, 244g of the sub-sections 240a, 240g positioned adjacent the sidewalls 252 of the auger housing 160 (hereinafter referred to as "the lateral inlets") are smaller in width than the inlets 244c, 244d, 244e positioned proximate the axis 179 of the auger housing 160 (hereinafter referred to as the "the central inlets"). More specifically, the inlets 244a-g may get progressively larger as the sub-sections 240a-g proceed inwardly toward the axis 179 of the auger housing 160. In such implementations, the smaller size of the lateral inlets (e.g., those inlets adjacent the sidewalls 252) is offset by the generally higher concentration of crop material 32 located in that same position. As such, each of the sub-sections 240a-g generally convey an equal amount of crop material 32 therethrough. In alternative implementations, the strippers 236 may be equally spaced along the width of the auger housing 160 (not shown) forming a plurality of sub-sections having equally sized inlets.

In the illustrated implementation, each stripper 236 is formed or fixedly coupled to the exterior wall 180 of the auger housing 160 and/or the base wall 156 of the inlet 60. However, in alternative implementations, one or more of the strippers 236 may be adjustable with respect to the auger housing 160 allowing the user to vary the distribution of the crop material 32 within the baler 10. In some implementations, each stripper 236 may be individually adjustable, allowing the inlet and outlet to be set independently of one another. In still other implementations, at least a portion of the strippers 236 may be operatively coupled to one another such that the strippers 236 may be adjusted together as a group. In such implementations, the individual strippers 236 may be joined so that a relative orientation may be maintained between the strippers 236, or so that the strippers 236 move in proportion to one another.

Illustrated in FIGS. 1A-2, the bale case 132 of the compression system 26 is substantially elongated in shape having a first open end 300 to receive crop material 32 from the auger assembly 28, and a second open end 304, opposite the first open end 300 positioned proximate the rear of the baler 10. During use, the bale case 132 acts as a container, holding the forming bale 144 against which the auger assembly 28 compresses the newly introduced crop material 32 from the feed system 22. While doing so, the bale case 132 applies a resistive force against the forming bale 144 to resist motion within the bale case 132 toward the second open end 304. In particular, it is this resistive force that permits the compressive force of the auger assembly 28 to compact the crop material 32 against the bale surface 140 of the forming bale 144 within the baling chamber 132.

In the illustrated implementation, the bale case 132 includes a top wall 308, a bottom wall 312 opposite the top wall 308, and a pair of side walls 316 extending between the top wall 308 and the bottom wall 312. Together, the walls 308, 312, 316 of the bale case 132 produce a substantially rectangular interior cross-section when taken perpendicular to the axis 179.

The walls 308, 312, 316 of the bale case 132 are adjustable with respect to one another to vary the amount of resistive force applied to the forming bale 144. Specifically, the walls 308, 312, 316 of the bale case 132 may move inwardly to apply more pressure to the outside of the forming bale 144 and therefore create a greater resistive force in the form of friction resulting between the compressive contact between the walls 308, 312, 316 and the forming bale 144. The walls 308, 312, 316 of the bale case 132 may also move outwardly, away from one another, to reduce the pressure on the outside of the forming bale 144 and therefore create less resistive force. Generally speaking, the greater the resistive force applied to the forming bale 144, the greater the amount of compression that is created as the auger assembly 28 operates.

FIGS. 6 and 7 illustrate another implementation of the auger assembly 28'. The auger assembly 28' is substantially similar to the auger assembly 28 and therefore only the differences will be described herein. In the auger assembly 28' the first and second augers 164a, 164b are oriented within the volume 184 such that the first axis 176a and the second axis 176b lie on a first plane 177 (described above) and are parallel.

The augers 164a, 164b are also positioned such that the first axis 176a is positioned a distance from the second axis 176b that is less than the flight diameter 208 of the two augers 164a, 164b. As such, the flights 196 of the first auger 164a overlap the flights 196 of the second auger 164b in the direction of the distance (e.g., in a radial direction) causing the flights 196 of the two augers 164a, 164b to intermesh. As a result, the two augers 164a, 164b define a cross-sectional shape that is wider than it is tall, and more specifically define a cross-sectional shape that is slightly less than two flight diameters 208 wide by one flight diameter 208 tall. This shape, in turn, at least partially dictates the height and width of the second open end 172 of the auger housing 160 and, as a corollary, defines the height and width of the cross-sectional shape of the forming bale 144.

Figure 5:
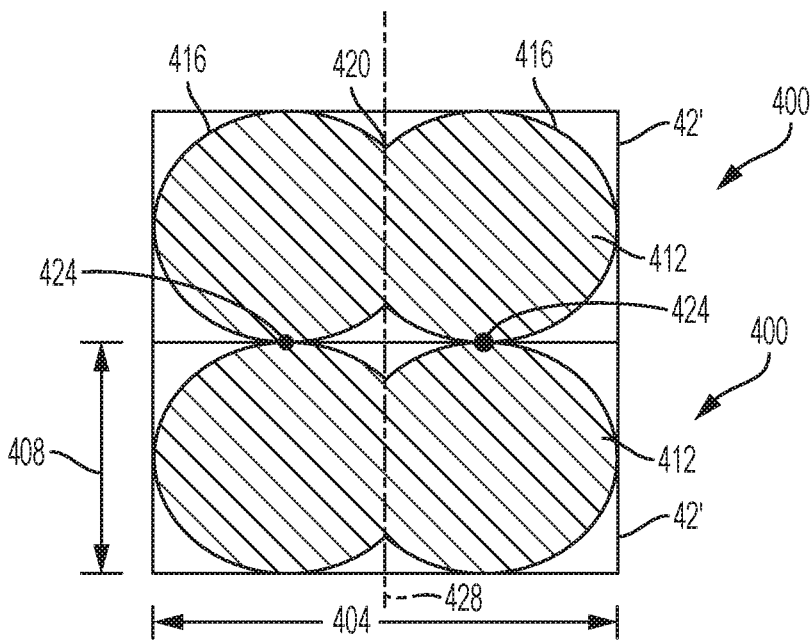
FIG. 5 is a side view of a density profile of two stacked bales formed from a baler of FIGS. 6 and 7.

During operation, both augers 164a, 164b rotate with respect to the auger housing 160 about their respective axis of rotation 176a, 176b, respectively. As the augers 164a, 164b rotate, the flights 196 of each auger 164a, 164b convey the crop material 32 axially along the axial length of the augers 164a, 164b and out the second open end 172. The interaction between the first auger 164a and the second auger 164b create a second density profile 400 at the bale face 140 of the forming bale 144 (FIG. 5). As described above, the density profile 400 of the forming bale 144 ultimately becomes the density profile of the bale 42'. In the first density profile 400, the two augers 164a, 164b produce a bale 42' having a substantially rectangular cross-sectional shape where the width 404 is greater than the height 408. Furthermore, the first density profile 400 includes a single high density region 412 that is wider than it is tall. More specifically, the high density region 412 includes a "peanut" shape having two enlarged ends 416 with narrow neck 420 extending therebetween. (FIG. 5). When two bales 164a, 164b with the second density profile 400 are stacked atop one another, the second density profile 400 produces multiple high density points of contact 424. More specifically, the first density profile 400 produces two high density points of contact 424 spaced either side of the midline 428 of the width 404 of the bale 42'.

FIG. 12B illustrates another implementation of the auger assembly 28". The auger assembly 28" is substantially similar to the auger assembly 28 and therefore only the differences will be described herein. In the auger assembly 28" the first and second augers 164a, 164b are oriented within the volume 184 such that the first axis 176a and the second axis 176b lie on a first plane 177 (described above) and form a first angle 290 therebetween. In the illustrated implementation, the first angle 290 is approximately greater than 0 degrees and approximately less than approximately 90 degrees. In other implementations, the first angle 290 is greater than approximately 5 degrees and less than approximately 15 degrees. As such, the augers 164*a*, 164*b* are configured to converge together along the length of the auger housing 160 (e.g., is open toward the first open end 168.

FIG. 12C illustrates another implementation of the auger assembly 28'. The auger assembly 28''' is substantially similar to the auger assembly 28 and therefore only the differences will be described herein. In the auger assembly 28''' the first and second augers 164*a*, 164*b* include a core 188 and one or more flights 196''' that vary in flight diameter 208 along the length of the core 188. More specifically, each auger 164*a*, 164*b* includes a first flight diameter 208*a'''* proximate the front end 192 of the core 188, and a second flight diameter 208*b'''* opposite the front end 192 of the core 188 where the first flight diameter 208*a'''* is greater than the second flight diameter 208*b'''*. FIG. 12D illustrates the auger assembly 28''' of FIG. 12C with the first and second axis 176*a*, 176*b* forming a first angle 290 therebetween that is greater than 0 degrees and less than 90 degrees.

Various features of the disclosure are set forth in the following claims.

What is claimed is:

1. A baler comprising:
   a frame;
   a feed assembly coupled to the frame;
   an auger housing coupled to the frame and in operable communication with the feed assembly, the auger housing having an exterior wall including a first open end, a second open end opposite the first open end, and defining a volume therein;
   a first auger at least partially positioned within the volume and rotatable with respect to the auger housing about a first axis, wherein the first axis passes through the first open end and the second open end;
   a second auger at least partially positioned within the volume and rotatable with respect to the auger housing about a second axis, wherein the second axis passes through the first open end and the second open end; and
   a bale case coupled to the frame and in operable communication with the volume of the auger housing, wherein the bale case is configured to apply a resistive force against a forming bale positioned therein, and wherein both the first auger and second auger convey crop material directly into the bale case.

2. The baler of claim 1, wherein the first axis and the second axis lie on a first plane.

3. The baler of claim 1, wherein the first axis is parallel to the second axis.

4. The baler of claim 1, wherein the auger housing defines a third axis extending along the length of the auger housing proximate its center, and wherein at least one of the first axis and the second axis is parallel to the third axis.

5. The baler of claim 1, wherein the feed assembly includes a pickup assembly, and an accelerator roll.

6. The baler of claim 1, wherein at least one of the first auger and the second auger comprises a core and at least one flight.

7. The baler of claim 6, wherein at least one of the first auger and the second auger includes two flights positioned 180 degrees from one another.

8. The baler of claim 6, wherein the at least one flight originates proximate a front end of the core and extends axially rearwardly in a helical pattern.

9. The baler of claim 8, wherein the at least one flight makes between approximately one-half and approximately two rotations about the core.

10. A baler comprising:
    a frame;
    a feed assembly coupled to the frame;
    an auger housing coupled to the frame and configured to receive crop material from the feed assembly, the auger housing having an exterior wall including a first open end, a second open end opposite the first open end, and wherein the exterior wall defines a volume therein;
    a first auger at least partially positioned within the volume and rotatable with respect to the auger housing about a first axis, wherein the first auger includes a flight defining a first flight diameter;
    a second auger at least partially positioned within the volume and rotatable with respect to the auger housing about a second axis, wherein the second auger includes a flight defining a second flight diameter,
    wherein the first axis is parallel to the second axis, and wherein the first axis is spaced a first distance from the second axis that is greater than the larger of the first flight diameter and the second flight diameter; and
    a bale case coupled to the frame and in operable communication with the volume of the auger housing, wherein the bale case is configured to apply a resistive force against a forming bale positioned therein, and wherein both the first auger and second auger axially discharge crop material directly into the bale case.

11. The baler of claim 10, wherein the first flight and the second flight do not overlap in the direction of the first distance.

12. The baler of claim 10, wherein the auger housing defines a third axis extending along the length of the auger housing proximate its center, and wherein at least one of the first axis and the second axis is parallel to the third axis.

13. The baler of claim 10, wherein the first axis and the second axis lie on a first plane.

14. The baler of claim 13, wherein the auger housing defines a third axis extending along the length of the auger housing proximate its center, and wherein the first plane is defined by the direction of the first distance and the third axis.

15. The baler of claim 10, wherein the auger housing defines a third axis extending along the length of the auger housing proximate its center, and wherein the cross-sectional shape of the volume taken perpendicular to the third axis is rectangular in shape.

16. The baler of claim 15, wherein the cross-sectional shape of the volume includes a first dimension in the direction of the first distance, and a second dimension perpendicular the direction of the first distance, and wherein the first dimension is greater than the second dimension.

17. The baler of claim 10, further comprising a drive assembly, and wherein the drive assembly is configured to rotate the first auger and the second auger at a first rotational speed.

18. The baler of claim 17, wherein the drive assembly is configured to rotate the first auger in a first rotational direction, and the second auger in a second rotational direction opposite the first rotational direction.

* * * * *